E. BUCKMAN.
Horse Hay Rake.
No. 33,183. Patented Sept. 3, 1861.
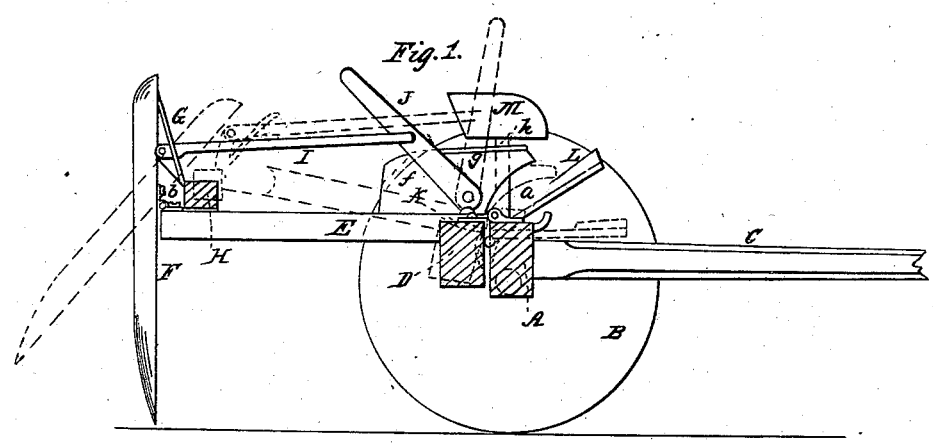
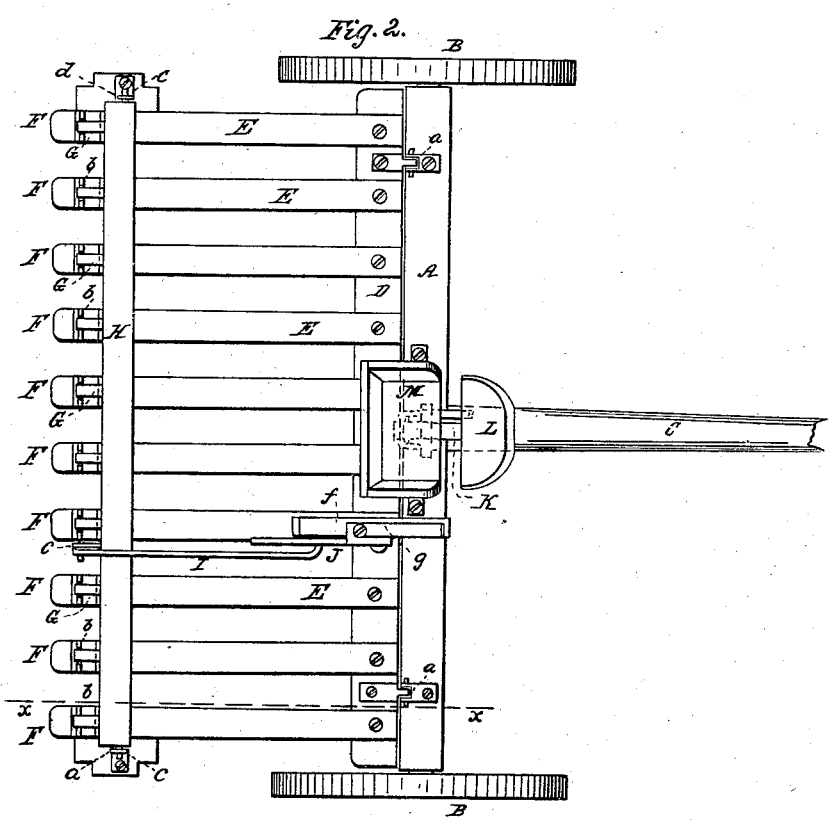
Witnesses:
Inventor:
Edward Buckman
per Munn & Co
Attorneys

UNITED STATES PATENT OFFICE.

EDWARD BUCKMAN, OF EAST GREENBUSH, NEW YORK.

IMPROVEMENT IN HORSE-RAKES.

Specification forming part of Letters Patent No. 33,183, dated September 3, 1861.

*To all whom it may concern:*

Be it known that I, EDWARD BUCKMAN, of East Greenbush, in the county of Rensselaer and State of New York, have invented a new and Improved Horse Hay-Rake; and I do hereby declare that the following is a full, clear, and exact description of the same, reference being had to the annexed drawings, making a part of this specification, in which—

Figure 1 is a side sectional view of my invention, taken in the line $x\ x$, Fig. 2; Fig. 2, a plan or top view of the same.

Similar letters of reference indicate corresponding parts in the two figures.

This invention relates to that class of horse hay-rakes which is provided with independent teeth—that is to say, teeth which are allowed to work or yield independently of each other, and all placed under the complete control of the driver or attendant, so that they may all be elevated simultaneously when required for the purpose of transportation.

The object of the invention is to obtain a simple implement of the kind specified, and one that will admit of being very readily manipulated, when desired, for the discharging of the hay and the placing and securing of the parts in proper position for the raking up of the same.

To enable those skilled in the art to fully understand and construct my invention, I will proceed to describe it.

A represents an axle, which is provided at each end with a wheel, B, and having a draft-pole, C, attached to its center.

To the back side of the axle A there is attached by hinges $a\ a$, a bar, D, said bar D having a series of parallel bars, E, secured to it at right angles, the bars E extending the whole length of bar D, as shown clearly in Fig. 2.

To the outer end of each bar E there is secured, by a hinge or joint, $b$, a tooth, F. These teeth may be of hard wood and brought to a point at their lower ends by a gradual taper, as shown clearly in Fig. 1, the bars E being connected to the teeth at points a little above their centers. The teeth F when at work have a horizontal position, and are thus retained by springs G, which are attached to a bar, H, the ends of said bar being provided with journals $c$, which are fitted in proper bearings $d\ d$ on the outer bars E at each side of the machine. (See Fig. 2.) The springs G may be of the usual flat form, or other shaped springs may be used. The bar H is allowed to turn freely in its bearings, but it is retained in proper position to keep the springs G in contact with the upper part of the teeth F by means of a rod, I, the back end of which is attached to an arm, $e$, of bar H, and the front end attached to a lever, J, the lower end of which is pivoted to a block, $f$, on bar D, the lever J being behind a catch, $g$, on block $f$. (See Fig. 1.)

In the axle A at about its center, there is placed a bent lever, K, having a foot-piece, L, on its front end, and its back end bearing against the front side of bar D. The foot-piece L is directly in front of the driver's seat M, which is secured to uprights $h\ h$ on the axle A.

From the above description it will be seen that when the springs G are secured in contact with the teeth F that the latter will be kept in a vertical working position, the springs being sufficiently strong to keep the teeth to their work, so that they cannot yield or give under the resistance of the hay which they rake up as the implement is drawn along, but still allowing the teeth to yield or give in case of the latter coming in contact with any obstruction, such as stones, stumps, &c. When the teeth have raked up a sufficient quantity of hay, the driver from his seat M releases the lever J from catch $g$, and all the teeth F being thereby relieved from the action of the springs immediately open under the resistance of the hay and deposit their load. When the load is discharged the driver throws back the lever J to its original position and the raking operation is resumed.

In transporting the implement from place to place, the driver from his seat M depresses the foot-piece L, and thereby throws up the bars E and teeth F, so that the latter will be entirely free from the ground.

The bar H with its springs G attached, admits of a very ready adjustment of the teeth F in proper working position, all the teeth being brought simultaneously to their work.

I do not claim, broadly and separately, the employment or use of hinged or pivoted teeth, for they have been used and arranged in various ways; but I do claim as new and desire to secure by Letters Patent—

The arrangement of the springs G and pivoted bar H, with the independent pivoted teeth F, arms E, lever J, hinged bar D, and foot-lever L, as herein shown and described.

EDWARD BUCKMAN.

Witnesses:
ALEXANDER BUCKMAN,
JOHN SEE, Jr.